April 30, 1929.  S. A. MOORE  1,711,394
GATE STRUCTURE
Filed Jan. 9, 1928
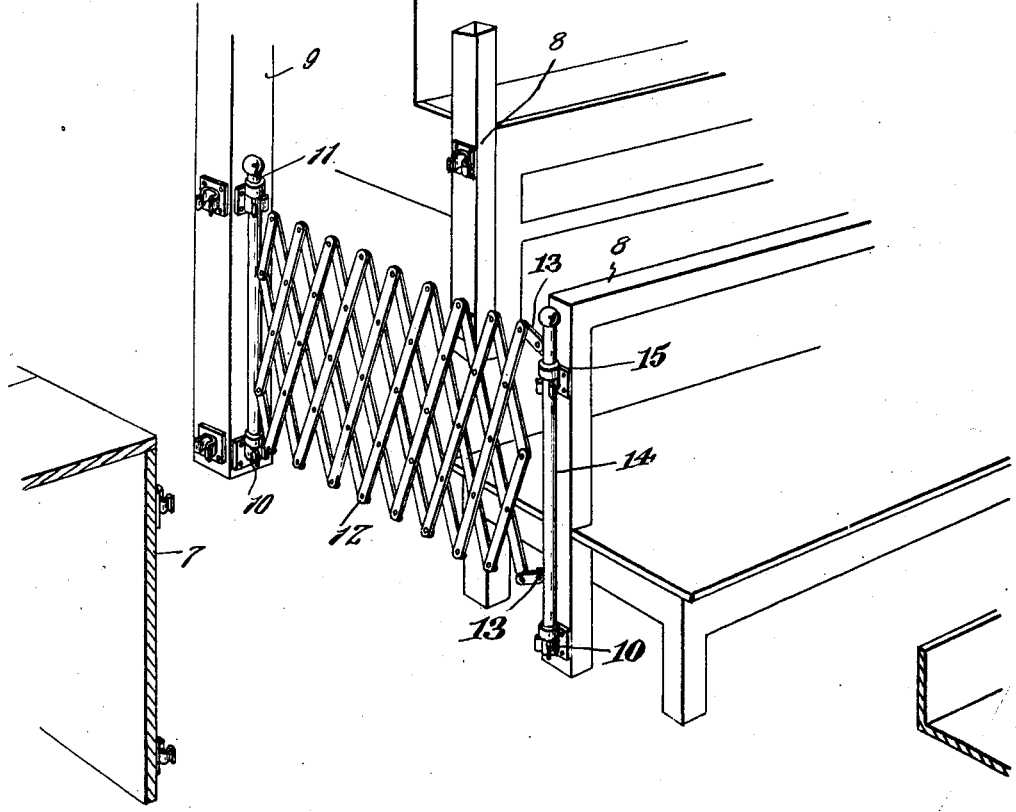
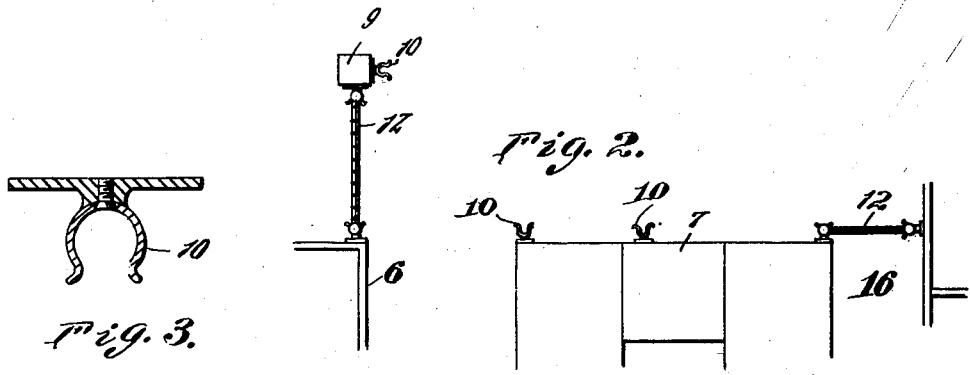
S. A. Moore
INVENTOR
BY Victor J. Evans
ATTORNEY Patented Apr. 30, 1929.

1,711,394

UNITED STATES PATENT OFFICE.

STEPHEN ANDERSON MOORE, OF ROANOKE, VIRGINIA.

GATE STRUCTURE.

Application filed January 9, 1928. Serial No. 245,566.

The object of this, my present invention, is the provision of a gate structure designed to be arranged at the intersection of angle passages and which is expansible and has posts pivotally secured to the ends thereof, one of said posts designed to be engaged by clips which are fixed on an upright at one of the passages and the second post to be engaged by like clips on the uprights or ends of any of the intersecting passages whereby the gate may be swung to offer a barrier to any of the said passages and further wherein the gate may be removed from the supporting clips of any one of the uprights and attached to the supporting clips on other uprights.

To the attainment of the foregoing the invention consists in the improvement as hereinafter described and definitely claimed.

In the drawings:

Figure 1 is a perspective view showing the improved gate which is swingable to several positions.

Figure 2 is a plan view to illustrate the employment of two gates for opening one passage and closing another.

Figure 3 is a detail sectional view of the combined catch and swingable support for the gates.

My improvement is especially adaptable for use in connection with self-serving stores but may, of course, be successfully employed in any other connection where it is desired that certain intersecting passages be closed and others opened. In the drawings the numerals 6, 7, 8 and 9 indicate uprights or the corners of intervening passages. On each of these uprights there is secured a pair of spaced cross sectionally U-shaped clips 10. The clips may have their mouths arranged in parallelism or the said clips may be positioned upon the uprights right angularly with respect to each other.

One or more gates may be employed but each is of a similar construction and each of the said gates is indicated by the numeral 12. As disclosed by the drawings each gate is made up of lazy tongs, or cross slats which are pivotally connected. The end slats have pivotally secured thereto links 13 which have their outer ends pivotally secured to the end posts 14 of the gates. Each end post is formed with an enlargement in the nature of a sleeve 15, and these sleeves are so spaced that the lower edges thereof will rest upon the upper edges of the clips 10 to which the gate is pivoted. A gate thus pivoted may be swung to various positions to close any of the several passageways. The outer post of the gate is, of course, engaged by the clips 10 into which the said posts are brought. The gate as previously stated is removable as well as expansible and the gate on the left hand side of Figure 3 may be thus brought to engage with either of the spring U-shaped clips 10 or what I have termed the upright 7, while the second gate 12 controls a passage 16 in the showing of Figure 3 of the drawings.

Having described the invention, I claim:

1. An expansible gate having posts pivotally secured to the ends thereof, fixed spaced spring clips engageable with one of the posts for providing a hinge connection for the gate and likewise engageable with the second post for latching the gate.

2. The combination with a pair of spaced uprights substantially U-shaped spring clips secured thereon, a gate having a body portion made up of pivotally connected levers, cross sectionally round posts for the ends of the body and to which the said body is pivotally connected, one of said posts designed to be received within the clips on one of the uprights to afford a hinge support for the gate, and the clips on the other upright designed to receive therein the second post for the gate to provide a latching means for said gate.

In testimony whereof I affix my signature.

STEPHEN ANDERSON MOORE.